United States Patent [19]

Hanks

[11] 4,453,684
[45] Jun. 12, 1984

[54] STEP OPERATED LOCKING MECHANISM FOR AIRCRAFT LOWER DOOR

[75] Inventor: John Hanks, Reno, Nev.

[73] Assignee: OMAC, Inc., Reno, Nev.

[21] Appl. No.: 329,093

[22] Filed: Dec. 9, 1981

[51] Int. Cl.³ .............................................. B64C 1/24
[52] U.S. Cl. ............................. 244/129.5; 244/129.6; 244/118.3; 49/131; 280/166; 292/336.3; 292/36; 105/430; 105/437; 105/447; 296/62; 182/77
[58] Field of Search .................. 244/118.3, 119, 129.1, 244/129.4, 129.5, 129.6, 137 P; 182/77; 49/37, 70, 131, 272, 364; 292/93, 336.3, 36; 296/62; 280/166, 164 R; 105/430, 431, 437, 438, 443, 447, 448

[56] References Cited

U.S. PATENT DOCUMENTS

| | | | |
|---|---|---|---|
| 287,880 | 11/1883 | Small | 182/77 |
| 1,216,436 | 2/1917 | Gillingham | 49/37 |
| 2,056,226 | 10/1936 | Mussey et al. | 105/437 |
| 2,196,546 | 4/1940 | Bowers | 244/129.5 |
| 2,910,255 | 10/1959 | Johnson | 244/129.6 |

FOREIGN PATENT DOCUMENTS

| | | | |
|---|---|---|---|
| 815921 | 6/1969 | Canada | 244/129.5 |
| 8403 | of 1911 | United Kingdom | 280/166 |

*Primary Examiner*—Galen L. Barefoot
*Attorney, Agent, or Firm*—Sughrue, Mion, Zinn, Macpeak & Seas

[57] ABSTRACT

Upper and lower sectional doors of rectangular configuration are mounted within an aircraft fuselage door frame and hinged for pivoting about horizontal axes at the upper and lower horizontal edges of respective door sections. A step is mounted to the interior of the lower door for pivoting along one horizontal edge about a horizontal axis between a first position with the step flush with the door interior and a second position projecting generally at right angles thereto. A plurality of laterally slidable latch pins fixed to the lower door section along vertical side edges are projectable into holes within the fuselage doorframe through a linkage system coupled to a shaft pivotably mounting the step to the door. The latch pins are projected to latching position when the step is folded flush to the door and retracted to unlatched position by manual movement of the step to its projected position prior to opening the lower door.

3 Claims, 4 Drawing Figures

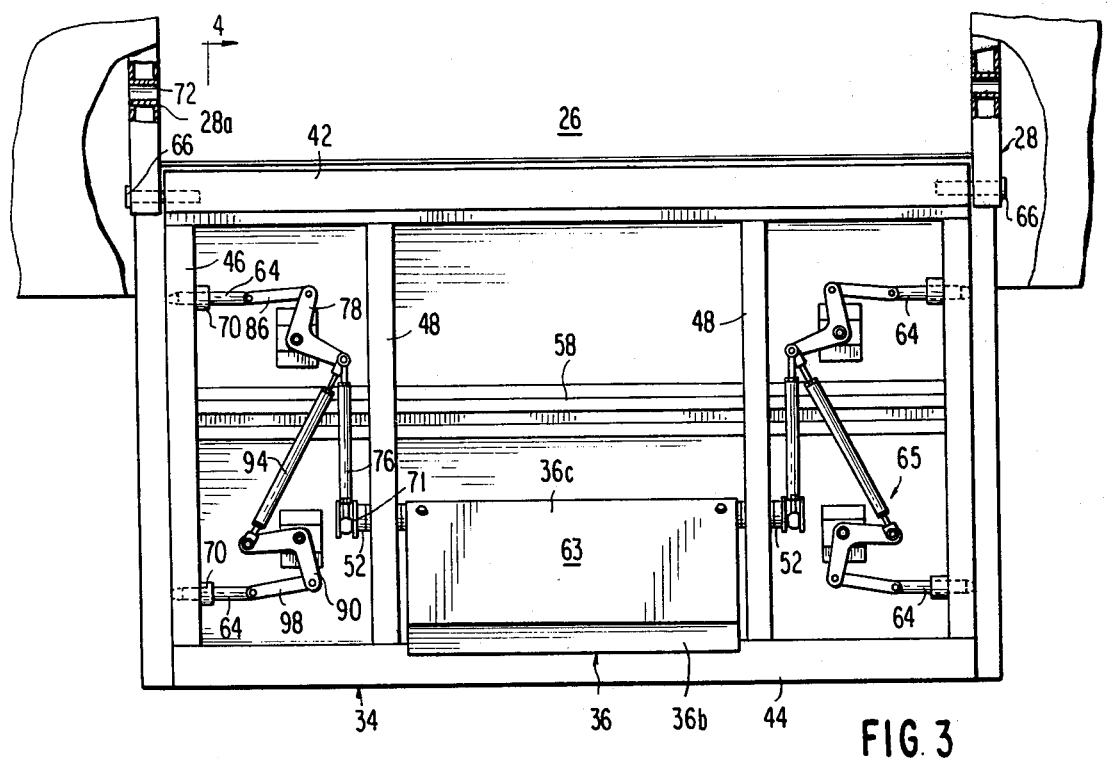
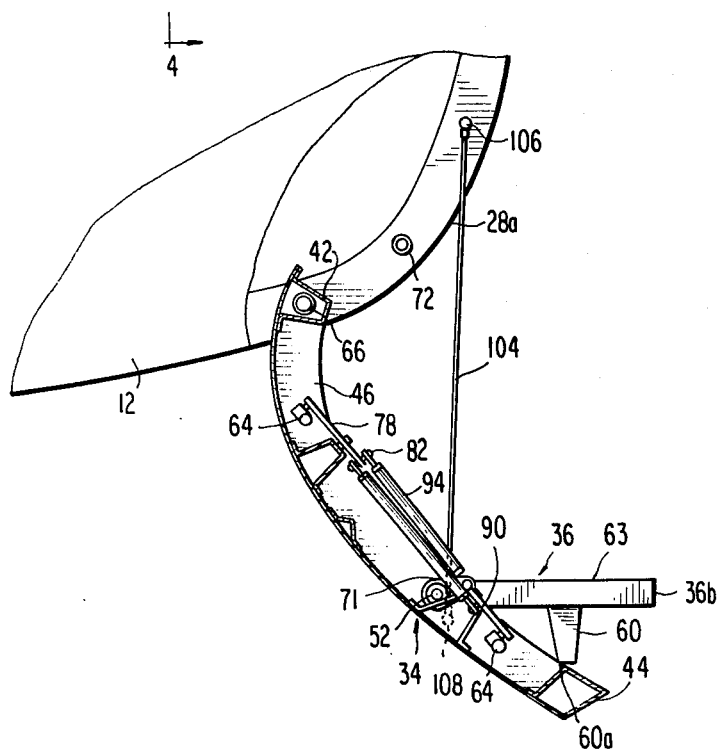

STEP OPERATED LOCKING MECHANISM FOR AIRCRAFT LOWER DOOR

BACKGROUND OF THE INVENTION

In the interest of safety, it is necessary that an aircraft door be locked in the closed position to prevent inadvertent opening of the door during aircraft flight. In small aircraft, such doors have been sectionalized to provide an upper door which pivots about a horizontal axis at its upper edge and a lower door which pivots about a horizontal axis at its lower edge. Thus the upper and lower doors are pivoted towards each other during closing so that confronting edges come together and cover the open doorway during flight. Typically, horizontal slidable locking pins are carried by the doors along the side edges of the doors and some hand operated mechanism is carried by the respective doors for shifting the locking pins to project outwardly of the door edges and into correspondingly sized holes within the fixed sides of the doorframe defining the doorway to the aircraft interior. Since the fuselage is at some vertical height above the runway, it is necessary to provide a step of some sort below the doorway opening in many cases to assist the passengers in embarking and debarking from the aircraft. Such a step or steps may be conveniently carried by the lower door of such sectional door aircraft.

It is, therefore, a primary object of the present invention to provide for an aircraft having a sectional door including a lower door pivoted about its lower horizontal edge, a pivotable step which may be pivoted during flight to a position flush with the inside surface of the lower door mounting the same, and wherein manual pivoting of the step to and from such position functions to effect latching and unlatching of the lower door relative to the aircraft fuselage.

SUMMARY OF THE INVENTION

The present invention is directed to an aircraft fuselage bearing a vertical axis doorway along the side of the fuselage and having a sectional door mounted within the doorway. The sectional door includes a generally rectangular upper door mounted for pivoting about a horizontal axis along its upper horizontal edge and a lower door of rectangular configuration pivotably mounted about its lower horizontal edge to form a clamshell type door for an aircraft. At least one latching pin is mounted along a side edge of the lower door for lateral projecting movement such that one end projects within a suitable opening within a doorframe sidewall for locking the lower door in closed position. The improvement comprises a step pivotably mounted on the interior of the lower door for pivoting between a first position with the step flush to the inner face of the lower door and a second position projecting generally horizontally outwardly thereof. Means responsive to pivoting of the step shifts the latching pin for latch projected position when the step is flush to the inner face of the lower door and into pin retracted door release position when the step is manually pivoted to the second, projected position.

Shafts extending horizontally from the interior of the step may be mounted for pivoting about their axis within bushings borne by ribs projecting inwardly from the door to opposite sides of the step which is fixed to the shafts for rotation therewith. Crank arms mounted to the ends of the shafts and each bear a connecting rod pivoted at one end to the end of the crank arm and at the opposite end to a bell crank at the end of one of its bifurcations. The other bifurcation is pin connected by a link to the lock pin. A second link also is pin connected at one end to the bell crank has its opposite end pin connected to a second bell crank which is pin connected by way of a link to a second lock pin to the same side of the aircraft lower door as the first locking pin. A rectangular block fixed to the bottom of the step and projecting outwardly therefrom functions as a hand hold for effectively pivoting the step between the second position projecting outwardly therefrom to said first position where it extends generally parallel to the lower door and flush therewith to effect locking and unlocking of the lower door.

BRIEF DESCRIPTION OF THE DRAWINGS

FIG. 3 is a vertical elevational view of the lower door in unlatched and open position with the actuator step to door delatch position.

FIG. 4 is a section view of the lower door taken about line 4—4 of FIG. 3.

DESCRIPTION OF THE PREFERRED EMBODIMENT

Figure 1:
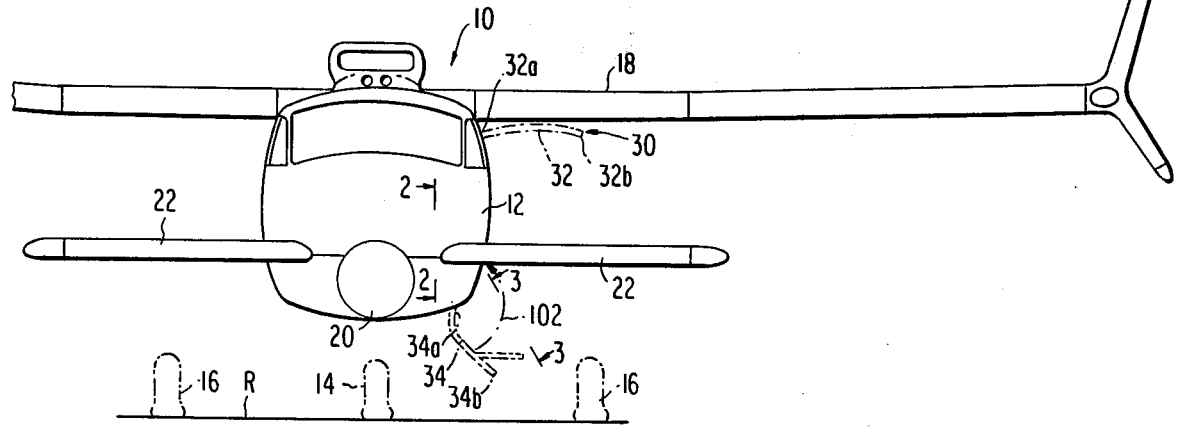
FIG. 1 is a front elevational view of a canard type aircraft showing sectioned doors to one side of the aircraft fuselage with a lower door pivoted about a horizontal lower edge and incorporating the pivotable step actuated door latching system forming a preferred embodiment of the present invention.

Referring to FIG. 1, there is shown a front elevational view of a delta wing, pusher type, canard aircraft indicated generally at 10 including a fuselage 12 supported by a tricycle landing gear (not shown) including a nose wheel 14 and main wheels 16 to the rear of the nose wheel. The canard type aircraft is characterized by a high delta wing indicated at 18 which spans across the top of the aircraft near the rear of the fuselage 12, while, near the nose 20 of the aircraft, there are canards constituting horizontal airfoils of short length as at 22 and providing additional lift to the aircraft not provided by the delta wing 18.

In the illustrated aircraft, an engine is mounted at the rear of the fuselage, which engine may be a jet prop type driving a prop not shown. The aircraft has great application as a small business prop jet, and in that respect, may include in addition to the pilot and copilot as many as six passengers who enter from the right side of the aircraft as seen from the front through a doorway 26 defined by a rectangular doorframe 28. The fuselage door indicated generally at 30 is sectional in form and comprised of an upper door 32 and a lower door indicated generally at 34. The upper door 32 has its horizontal upper edge 32a hinged for pivoting about a horizontal axis within the doorframe 28 and is pivotable to the dotted line position shown in FIG. 1 where it extends generally horizontally outwardly from the aircraft. In similar fashion, the lower door 34 is pivoted about a horizontal axis about its lower horizontal edge 34a to the dotted line, open position as shown. However, when the upper door 32 and lower door 34 are closed against the fuselage proper, the lower edge 32b of the upper door and the upper edge 34b of the lower door confront each other in clamshell fashion.

Typically, these door sections 32, 34, are locked or latched in closed position and unlocked or unlatched to permit opening of the door 30 for access to the interior of the fuselage 12. As may be appreciated, since the fuselage 12 is raised from the runway R to the extent shown, it is necessary that the lower door 34 be provided with a step. However, instead of a fixed step which is formed into the door itself, the present invention is directed not only to a step indicated generally at 36 which is carried by the lower door 34 on the inside thereof, but one in which the step pivots to the dotted line position shown in FIG. 1 from an initial position where the step faces and lies approximately flush against the interior of the door 34. Additionally, it is this pivoting action, which may be hand actuated, that effects unlatching of the lower door to permit gravity swing of lower door 34 to the dotted line position of FIG. 1.

Figure 2:
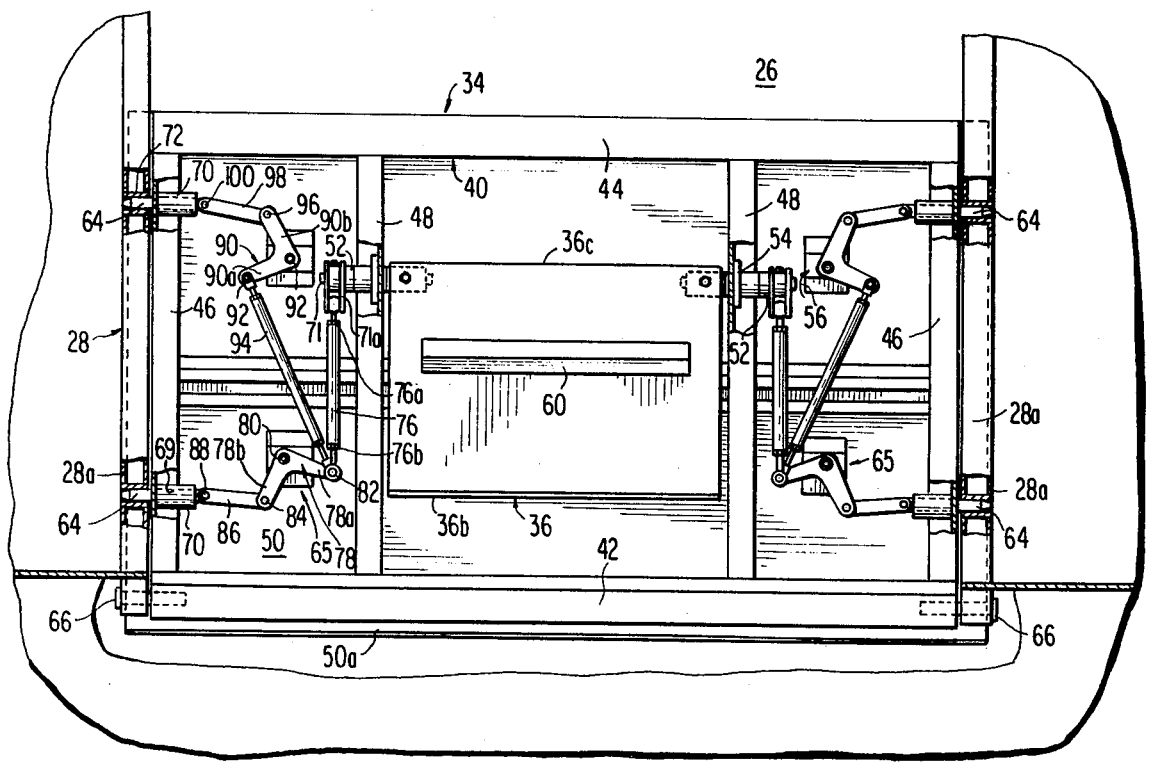
FIG. 2 is a vertical elevation of a portion of the interior of the aircraft illustrating the lower door and the step actuated latching system of FIG. 1.

The nature in which the step 36 functions as an element of the latching mechanism and the nature in which it is mounted for pivoting to a new flush position when the door is closed may be further seen by reference to FIGS. 2, 3 and 4. These show the mechanism in detail and the position of the elements when the lower door is latched as shown in FIG. 2 and when it is unlatched and the actuator step pivoted to its projected position to facilitate entry to the aircraft and exiting from the aircraft, FIGS. 3 and 4.

As may be seen more clearly in FIG. 2, the bottom door 34 occupies the lower portion of rectangular doorway 26 and extends laterally between laterally opposed sides 28a of the fuselage doorframe 28. As is conventional, the fuselage 12 is formed of thin sheet metal such as aluminum functioning as the skin of the aircraft and being riveted or otherwise fixed at spaced point locations along the fuselage framing including the doorframe. The upper and lower doors 32, 34 are similarly formed. For instance, for the lower door 34, there is provided a rectangular framework indicated generally at 40 and comprised of a horizontal bottom bar 42, a horizontal top bar 44, and a plurality of curved arcuate ribs as at 46 to each side of door 34 and intermediate ribs 48, all extending the full vertical height of the lower door 34. Sheet metal pieces as at 50 are riveted about their sides to the open framework 40 of the lower door with edges extending at top, bottom and sides, beyond the framework 40 as at 50a so as to closely match the dimensions of the doorway 26 and to close off the doorway when the upper and lower doors 32, 34 are closed and latched or locked.

As an aspect of the present invention, the step 36 comprises a rectangular planar metal member of some thickness which may be hollow and which is of a lateral width slightly less than the distance between the inner ribs 48 of lower door 34, between which it is placed. The step is provided with opposed horizontal edges as at 36a, 36b, which are maintained horizontal, whether the step is in retracted or projected position. Projecting from each side of the step 36, adjacent edge 36a, are shafts or pivot pins 52, slightly beyond the inner ribs 48. Holes are formed within the ribs 48 which are in excess in diameter to that of shaft 52 and mounted within these holes are bushings 54 having an internal diameter slightly larger than the diameter of shafts 52 and receive respective the ends of shafts 52 at sides of the step 36. With shafts 52 fixed to the step 36, the step 36 simply pivots about the aligned axes of shafts 52 as indicated by arrow 56. As shown, the step 36 is pivoted downwardly in FIG. 2 so that its inside wall or surface 63 faces and lies generally flush with the inner surface of door 34 specifically overlying sheet metal skin 50. If desired, a transverse rib or stiffeners may be provided at 58 spanning between the vertical ribs and functioning to strengthen the door 34. Since the strengthener 58 extends horizontally across the center of the slightlfy arcuate door 34, when the step 36 pivots to closed position, its inner surface 63 spans across and may contact stifferner 58 between the inner ribs 48.

In order to facilitate the pivoting of the step 36 from closed, i.e. flush position to projected or open position, the step 36 is provided with a hand bar 60 in the form of an elongated rectangular projection. Bar 60 is welded or otherwise attached to the step 36 at its center. The hand bar 60, which projects outwardly from surface 62 of the step 36, is exposed when the step 36 is pivoted to closed or retracted position is shown in FIG. 2.

As a second aspect of the invention, the step 36 itself functions as an element of the lower door latching system and as the actuating member for achieving that end through a two part mechanical linkage system 65.

In the illustrated embodiment of the invention, there are four separate latch pins as at 64, two to each side of the step 36 and functioning to latch the lower door 34 secured to the fuselage doorframe 28 to each side of door 26, when the lower door is pivoted to closed position. In that respect, the lower door 34 is illustrated as being hinged by way of pivot pins 66 which are fixed to the door bottom bar 42 and projecting horizontally to each side of the door 34 through bushings 68 mounted within the fuselage doorframe vertical members. As may be appreciated, in FIG. 2, the door in opening moves away from the plane of the figure and pivots approximately 180° to the dotted line position shown in FIG. 1. Mechanical stops (not shown) provided within fuselage 12 function to limit the pivoting of the lower door to the position shown. This may be seen also by further reference to FIG. 3 which is a vertical elevation of a portion of the aircraft, from the aircraft exterior, showing the door opening 26 within the fuselage 12 and the nature in which pivoting of the step 36 from retracted to projected position functions to mechanically unlatch the door and to then permit the door to pivot to the dotted line, open position of FIG. 1.

The latch pins 64 comprise solid metal pins slidably borne by bushings 70 horizontally mounted within holes 69 formed within the outside ribs 46 to each side of the bottom door 34, the bushings 70 supporting the latch pins 64 for axial sliding movement to and from the latch position shown in FIG. 2. Cooperating bushings 72 are mounted to the doorframe sides 28a. The mechanical linkage system for effecting that action for both pairs of pins on opposite sides of the door, takes the form of paired linkage mechanisms to respective sides of step 36. In that respect, the shafts 52 functioning to support the step 36 for pivoting about the axis of the shaft 52 further carries crank arms 71 at the ends of the shaft which ends project through the interior ribs 48. The crank arms 71 terminate in a clevis 71a. A clevis pin 74 projects through the bifurcations of the clevis 71a. A connecting rod or actuating lever 76 is pin connected by way of pin 74 to the clevis 71a at one end 76a.

A pair of bell crank members are provided within each linkage system sections to each side of the step 36. A first bell crank 78 which is of generally L-shaped configuration includes a first arm 78a and a second arm 78b and is pivoted about its center to door 34 by a pivot pin 80. Further, a pin 82 pin connects the other end 76b of the connecting rod, linking the bell crank 78 to clevis 72a. The other arm 78b of the bell crank 78 is pin connected by way of pin 84 to one end of a link 86, the opposite end of link 86 being pin connected directly to one of the latch pins 64 by pin 88. On the same side of the door, a second bell crank 90 is mounted for pivoting by way of pin 92 about the center of this L-shaped member. Bell crank 90 has one arm 90a whose outer end is pivotably connected by way of pin 92 to one end of a link 94, whose opposite end is pin connected by way of pin 82 to the arm 78a of the bell crank 78. The other arm 90b of bell crank 90 is pin connected by way of pin 96 to one end of a link 98 whose opposite end is pin connected by way of pin 100 to the inboard end of a second latch pin 64. The bell cranks 78 and 90 pivot about axes which are perpendicular to the general plane of the door and which are also at right angles to the pivot axis of shafts 52 which function as the horizontal pivot axis for the step 36.

The linkage system components to opposite sides of the lower door step 36 are mirror images of each other and are identical in all respects, controlling sliding movement of four latch pins 64, all of which operate simultaneously and which move into latching position and out of latching position by pivoting of the step 36 from the position shown in FIG. 3 to the position shown in FIG. 2, and vice versa.

As may be appreciated by comparing FIGS. 2 and 3, in FIG. 3, the lower door 34 has swung to open position about the horizontal pivot axis as defined by pivot pins 66 to each side of the aircraft doorway 26. The elements as seen on the interior surface of the lower door 34 in FIG. 3 are inverted because the door has pivoted outwardly and downwardly through the dotted line arc 102, FIG. 1. Additionally, the step 36 has moved from retracted position, FIG. 2, to projected position, FIG. 3, such that the surface 63 of step 36 which faced the inner surface of the door 34 to which it is mounted, is now exposed and is generally horizontally permitting a person to step on that surface when entering the aircraft or exiting therefrom, held there by the linkage. Additionally, in pivoting of the step 36 from the closed or retracted position, shafts 52 have rotated as per arrow 56, FIG. 2, to the same extent, driven by the lower door step 36 and the crank arm 72 has necessarily followed that arcuate path. This causes the connecting rods or links 76 to follow this movement. This rotates bell crank 78, in turn, retracting the locking pin 64 linked to that bell crank via link 86 free of the hole 65 within the doorframe 28 of the fuselage.

Simultaneously, link 94 moves to pivot the link 90 about the axis of pin 92, to retract the second latch pin 64 connected thereto through link 98. Mirror image operation occurs to respective sides of step 36.

During closure, the opposite action occurs after the door is swung upwardly into the position shown in FIG. 2 about the axes of door pivot pins 66. As may be appreciated, with the door in closed position, the step 36 hangs below its own pivot axis such that gravity, if nothing else, maintains the pins 64 in latched position. Significant friction is provided within the linkage system and the latch pins sliding in bushings 70, 72 such that no inadvertent opening of the lower door may occur absent a forced pivoting of the step 36 from retracted to projected position.

Further, during opening, the step 36 pivots to the position shown in FIG. 4, and the thickness of bar 60 is such that the end 60a acts as a stop by abutting transverse bar 44 of the door 34 to maintain surface 63 of the step 36 horizontal. As mentioned previously, mechanical stops are employed for preventing further clockwise rotation of the lower door 34, FIG. 4, about the axis defined by the pivot pins 66. One arrangement may comprise paired cables as at 104, mechanically fixed at one end as at 106 to the doorframe 28a and at its opposite end by way of attachment fitting 108 to outer rib 46 to each side of the lower door 34.

While the invention has been particularly shown and described with reference to a preferred embodiment thereof, it will be understood by those skilled in the art that various changes in form and details may be made therein without departing from the spirit and scope of the invention.

What is claimed is:

1. In an aircraft including a fuselage, a generally rectangular doorframe along one side of the fuselage and defining a vertical axis doorway, a generally rectangular upper door, hinge mounted along its upper, horizontal edge to the top of said doorframe for pivoting about a horizontal axis, a generally rectangular lower door, hinge mounted about its lower horizontal edge to the bottom of said doorframe, said upper and lower doors forming a sectional clamshell type door assembly for said aircraft, at least one latch pin mounted along a side edge of the lower door for lateral projecting movement into a suitable opening within said doorframe for locking the lower door in closed position, the improvement comprising:

a step pivotably mounted on the interior of the lower door for pivoting between a first position with the step generally flush with the inner surface of the inner door and a second position projecting generally horizontally outwardly thereof, and a linkage system operatively connecting said step to said at least one latch pin and responsive to pivoting of said step for shifting the latching pin from latch projected position when the step is in its first position, to pin retracted, door release position when said step is pivoted to said second, projected position.

2. The aircraft as claimed in claim 1, wherein said means for pivotably mounting said step to the interior of the lower door comprises a pair of laterally spaced ribs extending vertically along the interior of the lower door, shaft means carried by the step and having ends extending outwardly from opposed ends of said step along one edge thereof with said ends rotatably mounted within said ribs, and wherein said linkage system comprises a crank arm mounted to the end of said shaft means, a first bell crank mounted to the interior of said door and pivotable about an axis at right angles to the axis of said shaft means, a first link pivotably connected at respective ends to said crank shaft and one end of said bell crank, and a second link pivotably connected at its ends respectively to the other end of said bell crank and said latch pin.

3. The aircraft as claimed in claim 2, wherein said at least one latch pin comprises two pins slidably mounted along one side edge of said lower door at vertically spaced positions for lateral projecting movement into corresponding openings within said doorframe, and wherein said linkage system further comprises a second bell crank mounted to the interior of the door in proximity to the other latch pin for pivoting about an axis at right angles to shaft means, and wherein a third link is pivotably connected at respective ends to said first bell crank and to said second bell crank, and wherein a fourth link is pivotably connected at its ends respectively to said second bell crank and to said second latch pin such that rotation of said shaft means and pivoting of said step from said first position to said second position causes simultaneously both latch pins to be retracted to door release position to permit said door to pivot along to lower horizontal edge outwardly and away from the doorframe of said aircraft fuselage.

* * * * *